(12) United States Patent
Flaig (10) Patent No.: US 12,000,426 B2
(45) Date of Patent: Jun. 4, 2024

(54) LOCKNUT

(71) Applicant: SF Handels—und Besitzgesellschaft mbH, Aldingen/Württ (DE)

(72) Inventor: Hartmut Flaig, Aldingen (DE)

(73) Assignee: SF HANDELS—UND BESITZGESELLSCHAFT MBH, Aldingen/Wuertt (DE)

( * ) Notice: Subject to any disclaimer, the term of this patent is extended or adjusted under 35 U.S.C. 154(b) by 303 days.

(21) Appl. No.: 17/632,278

(22) PCT Filed: Jul. 30, 2020

(86) PCT No.: PCT/EP2020/071558
§ 371 (c)(1),
(2) Date: Feb. 2, 2022

(87) PCT Pub. No.: WO2021/023626
PCT Pub. Date: Feb. 11, 2021

(65) Prior Publication Data
US 2022/0290714 A1  Sep. 15, 2022

(30) Foreign Application Priority Data

Aug. 2, 2019 (DE) .......................... 102019120894.7

(51) Int. Cl.
*F16B 39/16* (2006.01)
*F16B 39/14* (2006.01)
*F16B 39/282* (2006.01)

(52) U.S. Cl.
CPC .............. *F16B 39/16* (2013.01); *F16B 39/14* (2013.01); *F16B 39/282* (2013.01)

(58) Field of Classification Search
CPC .......... F16B 37/00; F16B 39/10; F16B 39/14; F16B 39/16; F16B 39/24; F16B 39/282
(Continued)

(56) References Cited

U.S. PATENT DOCUMENTS 646,898 A   4/1900  Deiters et al.
1,157,230 A * 10/1915  Klettke ................... F16B 39/10
                                                        411/326
(Continued)

FOREIGN PATENT DOCUMENTS

DE        838840 C     5/1952
DE       2638560 A1    3/1978
(Continued)

*Primary Examiner* — Roberta S Delisle
(74) *Attorney, Agent, or Firm* — Grossman, Tucker, Perreault & Pfleger, PLLC (57) ABSTRACT

The invention provides a locknut having a nut body having a threaded portion with an internal thread, an adjacent perimetral shoulder and a collar surrounding the shoulder, and having a metal annular washer, the annular washer resting on the shoulder within the collar and the collar being bent inwardly to form an annular groove between the bent collar and the shoulder in which the annular washer is received. An internal thread corresponding to the internal thread of the threaded portion of the nut body is formed at the inner perimeter of the annular washer, and the internal thread of the annular washer is offset axially by a distance with respect to the internal thread of the nut body. For better fixing of the annular washer in the annular groove, a row of projections or recesses is formed on the shoulder or on the annular washer where the annular washer and the shoulder overlap, which projections or recesses project in the axial direction and are arranged distributed around the perimeter of the shoulder or the annular washer. The projections form bearing surfaces, lines or points for the annular washer on the shoulder when the annular washer is placed inside the collar on the shoulder of the nut body. When the collar is deformed to form the annular groove, an axial force is applied to the annular washer, partially deforming the projections or recesses and/or partially pressing them into the opposite surface of the annular washer or the shoulder. As a
(Continued)

result, the annular washer is held in the annular groove in a force-locking and form-fitting manner.

20 Claims, 10 Drawing Sheets

(58) Field of Classification Search
USPC ........ 411/190, 197, 204, 427, 432, 531, 533
See application file for complete search history.

(56) References Cited

U.S. PATENT DOCUMENTS

| | | | | |
|---|---|---|---|---|
| 4,907,924 | A * | 3/1990 | Hellon | F16B 39/38 411/303 |
| 5,595,466 | A * | 1/1997 | DeHaitre | F16B 39/34 411/303 |
| 11,719,274 | B2 * | 8/2023 | Mesiti | F16B 39/12 411/246 |
| 2014/0086702 | A1 * | 3/2014 | Imai | F16B 39/28 411/190 |
| 2014/0248104 | A1 * | 9/2014 | Tanaka | F16B 37/068 411/427 |

FOREIGN PATENT DOCUMENTS

| | | | |
|---|---|---|---|
| GB | 610355 | A | 10/1948 |
| GB | 2287764 | A | 9/1995 |

* cited by examiner

LOCKNUT

The invention relates to a locknut according to the preamble of claim 1. Such locknuts are known, for example, from DE 26 38 560 C, DE 43 13 809 C1, DE 43 13 845 C1 and WO 2011/000 393 A1.

The locknut is a reusable integrally metallic nut, in particular a nut integrally made of steel with an internally threaded metal nut body and an adjacent collar which is deformed into an annular groove to hold a locking washer made of metal therein. The locknut is manufactured by placing the annular washer inside the collar on the nut body, crimping the collar to hold the annular washer in the annular groove thus formed, and then cutting the internal thread simultaneously in the nut body and the annular washer. This results in a thread corresponding to the nut thread on the inner peripheral edge of the locking annular washer. The annular washer and its thread are axially offset relative to the nut thread by a small distance, for example by a distance corresponding to approximately 5-30%, preferably 10-20% of the thread pitch of the nut thread, in order to adjust the clamping effect of the locknut. The locking annular washer has a certain elasticity in the axial direction, whereby the clamping force of the locking nut can be adjusted by the offset of the internal thread of the annular washer and the locking nut maintains this adjusted clamping force for many screwing operations.

Locknuts of this type provide an effective and simple means of securing screws against loosening of a screw connection. No further fasteners or machine elements and no further machining of a screw shank, threaded end or bolt is required to secure the screw. The locking washer forms a clamping part that can be elastically deformed when a screw or bolt is screwed in. This results in radial and axial holding forces that can be adjusted via the offset of the locking annular washer. The locknut ensures a permanent connection even with large temperature fluctuations and vibrations This well-known locknut has excellent locking properties and has therefore become established on the market. In order to increase the elasticity of the locking annular washer, which may be desirable e.g. for certain nut sizes or for extreme temperature loads, the above-mentioned documents suggest to provide the annular washer with variable thickness in radial direction, with segment-like perimetral recesses on its outer perimeter and/or with additional notches on the outer perimeter. This makes it possible to manufacture the annular washer from a hard elastic material, such as spring steel, and still achieve the required elasticity for the desired axial deflection, while at the same time keeping the elastic restoring force of the annular washer high enough to achieve high holding forces. Since the annular washer is made of a material that is at least as hard as that of the nut body, the threads of the annular washer remain undamaged after many screwing operations, so that the locknut can be loosened and retightened several times without any noticeable change in the clamping force in the locking position. Materials that can withstand very high temperatures can be used, which is of great importance when used in motor vehicles, for example.

The aforementioned documents propose viable solutions for optimising the elasticity of the retaining annular washer. In practice, however, it has been shown that the fixation of the retaining annular washer in the ring groove could still be improved.

In the prior art, locknuts are also known with a locking and sealing ring made of plastic, which is held on a collar of the nut body in a similar way to the generic locknut. Such locknuts are described, for example, in EP 0 047 061 A1, DE-A-1 815 585, DE 36 40 225 C2, DE 84 24 281 U1, U.S. Pat. Nos. 4,019,550, 3,275,054, 3,316,338, 2,450,694, 5,454,675. However, these locknuts are based on a different operating principle. An initially unthreaded portion of a plastic retaining and sealing ring connects directly to the internal thread of the nut and protrudes slightly beyond the internal thread. When a bolt is screwed in, it cuts into the inner perimeter of the locking and sealing washer. The majority of the above-mentioned documents deal with the absorption of the receding plastic material when the bolt is screwed in.

The teachings of this prior art are not transferable to a locknut integrally made of metal with regard to the adjustment of the elasticity and holding force of the locking annular washer, among other reasons, because the plastic annular washer behaves differently with regard to its elasticity than a annular washer made of metal and because this prior art does not provide for an axial offset of the internal threads of the annular washer and nut body. The holding force of these locknuts is based on a different operating principle. It is an aim of the invention to further optimise the reliability of locknut integrally made of metal.

This task is solved by a locknut according to claim 1 and by a method according to claim 20. The dependent claims define embodiments.

The invention provides a locknut with a nut body having a threaded portion with an internal thread, a perimetral shoulder adjacent the threaded portion and a collar surrounding the shoulder, and with an annular washer made of metal, the annular washer resting on the shoulder inside the collar and the collar being bent inwards to form an annular groove between the bent collar and the shoulder in which the annular washer is received. An internal thread corresponding to the internal thread of the threaded portion of the nut body is formed at the inner perimeter of the annular washer, and the internal thread of the annular washer is axially offset with respect to the internal thread of the nut body by a distance. For better fixing of the annular washer in the annular groove, a series of projections or recesses is formed on the shoulder or on the annular washer where the annular washer and the shoulder overlap each other, which projections or recesses project in the axial direction and are arranged distributed around the perimeter of the shoulder or the annular washer. The projections or recesses form bearing surfaces, lines or points for the annular washer on the shoulder when the annular washer is placed inside the collar on the shoulder of the nut body. By deforming the collar to form the annular groove, an axial force is applied to the annular washer, partially deforming the projections or recesses or the remaining material between the recesses and/or partially pressing them into the opposite surface, the annular washer or the shoulder. As a result, the annular washer is cramped in the annular groove in a force-locking and form-fitting manner. The protrusions formed on the shoulder or on the annular washer or the material between the recesses penetrate the opposite surface of the annular washer or the shoulder to some extent when the collar is deformed and thereby secure the annular washer within the annular groove against rotations. Furthermore, the protrusions or recesses allow more precise adjustment of the axial offset of the annular washer because they are more adaptable than a continuous or stepped surface of the shoulder or annular washer.

In various embodiments, the projections or recesses are radially aligned and evenly distributed around the perimeter of the shoulder or annular washer. This provides good alignment of the annular washer perpendicular to the axis of the nut body.

Depending on the size of the locknut, a different number of projections or recesses may be radially selected, with at least 16 projections or recesses being provided in various embodiments. For example, at least 24 or 40 projections or recesses may also be provided radially.

The protrusions or the remaining material between the recesses can have different shapes. In various embodiments, the protrusions or remaining material have the shape of a convex curvature, in particular a circular or oval dome or a lying semi-circular cylinder, or a cornered or pointed shape, in particular the shape of a lying triangular cylinder or a tetrahedron, or approximately such a shape. Particularly good results were obtained with protrusions or remaining material between the recesses in the shape of an irregular tetrahedron.

When the protrusions or recesses are formed on the shoulder, for example, a first face of the tetrahedron may be adjacent to the collar and a second face of the tetrahedron may be adjacent to the shoulder so that the height of the tetrahedron decreases in the radial direction from the collar towards the inner perimeter of the shoulder. The protrusion or remaining material between the recesses, for example the tetrahedron, may extend in the radial direction over all or only part of the shoulder, for example from the collar to over ½ to ⅘ of the radial extension of the shoulder.

When the protrusions or recesses are formed on the annular washer, for example, a first surface of the tetrahedron may be aligned with the outer perimeter of the annular washer and a second surface of the tetrahedron may be adjacent to the annular washer so that the height of the tetrahedron decreases in the radial direction from the outer perimeter of the annular washer towards the inner perimeter of the annular washer. The protrusion or remaining material between the recesses, for example the tetrahedron, may extend in the radial direction over all or only part of the annular washer, for example from the outer perimeter of the annular washer to over ½ to ⅘ of the radial extension of the annular washer.

In various embodiments, the shoulder has a shoulder surface that is inclined relative to a radial plane of the locking nut by an angle $\alpha\_s$, where $\alpha\_s$ is in the range of about 0° to 15°, or is about 5°, or 10°. Also, the protrusions or remaining material between the recesses may have an apex line that is inclined relative to a radial plane of the locknut by an angle $\alpha\_v$, where $\alpha\_v > \alpha\_s$, and where $\alpha\_v$ is in the range of, for example, 30° to 60°, or is about 40°, 450, or 50°.

In various embodiments, the width B of the projections or recesses relative to the centre-to-centre distance A of the projections where they abut the collar is equal to or approximately equal to $B = b*A$, where b ranges from 0.2 to 1, more particularly from 0.5 to 1, or is approximately 1 or approximately 0.5. The maximum height of the protrusions or of the remaining material between the recesses may be approximately equal to their width or in the range from half the width to twice the width. The maximum height of the protrusions 40 and/or the remaining material between the recesses may be dependent on the thickness of the securing annular washer 22 and may be, for example, 0.25 times the thickness of the washer up to once washer thickness. The width of the protrusions and/or the height of the protrusions and/or the remaining material between the recesses may decrease radially inwards.

In a further embodiment, perimetrally aligned projections are formed on the shoulder of the nut body. The protrusions may be formed, for example, by forming on the shoulder of the nut body a perimetrally extending one-piece or multi-piece rib in which recesses are formed by receiving the annular washer in the annular groove, which recesses reshape the rib into a plurality of perimetrally aligned protrusions. For example, a one-piece rib can be formed by forming a frontal recess in the shoulder adjacent to the collar, for example by turning the nut body. If the annular washer has claws or other prolongations on its periphery, these can penetrate the rib when the collar of the nut body is flanged and come to rest in recesses formed in the rib as a result. This secures the annular washer in the nut body against rotating.

In a further embodiment, perimetrally aligned projections are formed on the surface of the annular washer facing the shoulder of the nut body. The projections may be formed, for example, by forming on the surface of the annular washer a perimetrally extending one-piece or multi-piece rib in which, when the annular washer is received in the annular groove, recesses are formed which reshape the rib into a plurality of perimetrally aligned projections. For example, a one-piece rib may be formed by forming a frontal recess in the surface of the annular washer, for example by turning the annular washer. If the shoulder of the nut body has claws or other prolongations on its periphery, these can penetrate the rib when the collar of the nut body is flanged and come to rest in recesses formed in the rib as a result. This secures the annular washer in the nut body against rotating.

In various embodiments, the annular washer may have a constant thickness, or the thickness of the annular washer at its inner diameter may be greater than the thickness of the annular washer at its outer diameter.

In various embodiments, the annular washer is displaced relative to the nut body such that the internal thread of the annular washer is axially offset with respect to the internal thread of the nut body by a distance that is approximately 5-30%, in particular 10-20%, of the thread pitch of the internal thread. For example, the internal thread of the annular washer is axially offset from the internal thread of the nut body by a distance that is approximately 10% or 20% of the thread pitch. The offset of the annular washer and its internal thread can be used to adjust the clamping force of the locknut.

In various embodiments, the thickness of the annular washer at its inner diameter is equal to or approximately equal to a thread pitch of the internal thread or is between one thread pitch and 1.5 times a thread pitch.

In various embodiments, the annular washer is convexly curved in the direction of the front side of the locknut.

In various embodiments, several cut-outs and/or claws distributed over the perimeter of the annular washer are formed in the outer perimeter of the annular washer.

The annular washer is made of metal, especially spring steel. The nut body is also made of metal, especially steel.

The invention also provides a method of manufacturing a locknut of the type explained above. The washer is placed inside the collar on the shoulder of the nut body, which is still unthreaded. A first force is applied axially to the collar to deform the collar inwardly, also known as "flanging", and to form an annular groove between the flanged collar and the shoulder in which the annular washer is axially clamped. By applying the first force, the projections or the remaining material between the recesses are deformed by a first distance and penetrate a little into the opposite surface. Then, in a single operation, an internal thread is formed in the nut body and the annular washer, the annular washer being secured against rotation in the annular groove by the projections. A second force is then exerted in the axial direction on the collar and the annular groove in which the annular washer is clamped in order to displace the annular washer in the axial direction. By applying the second force, the projections or the remaining material between the recesses are deformed by a second distance. The projections or the remaining material between the recesses allow a precise and uniform lowering of the washer in axial direction and thus a precise adjustment of the thread offset. Furthermore, the projections or the remaining material between the recesses achieve, in addition to the force-fixing of the annular washer in the annular groove, also a form-fitting between the annular washer and the nut body, which secures the annular washer against rotation in the annular groove. This is particularly advantageous when cutting the thread because the annular washer cannot be rotated during the cutting process.

In another example, the method of making a locknut comprises forming a perimetral rib on the shoulder of the nut body by frontally puncturing the shoulder adjacent to the collar. Subsequently, the annular washer is placed inside the collar on the shoulder of the still unthreaded nut body and a first force is applied axially to the collar to flange the collar inwardly and form an annular groove between the flanged collar and the shoulder in which the annular washer is axially clamped, wherein by applying the first force, the claws formed on the outer periphery of the annular washer penetrate the perimetral rib and come to rest in recesses thereby formed in the rib.

Subsequently, in a single operation, an internal thread can be formed in the nut body and the annular washer, and then a second force can be applied axially to the collar and the annular groove in which the annular washer is clamped to displace the annular washer axially, wherein by applying the second force, the claws penetrate the rib by a further distance.

Conversely, a perimetral rib can also be formed on a surface of the annular washer facing the shoulder, and corresponding projections or claws can be perimetrally aligned on the shoulder of the nut body so that the projections or claws penetrate into the rib on the annular washer when the collar is flanged.

The interaction between the rib and the claws allows a precise and uniform lowering of the washer in axial direction and thus a precise adjustment of the thread offset. Furthermore, the protrusions and recesses formed in the process achieve, in addition to the frictional fixing of the annular washer in the annular groove, a form-fitting connection between the annular washer and the nut body, which secures the annular washer against rotation in the annular groove. This is particularly advantageous when forming the thread because the annular washer cannot be rotated during the cutting process.

In various embodiments, the annular washer is manufactured in a pre-processing step with convex curvature and is placed on the shoulder of the nut body in such a way that the annular washer is convexly curved in the direction of the front side of the locknut, whereby the convex curvature of the annular washer is maintained or substantially maintained during deformation.

The invention is explained in more detail below by means of an embodiment with reference to the drawings. The figures show.

The figures refer to an example of an embodiment, whereby modifications can be made, for example as in the embodiments described above. For the sake of clarity, not all features are given reference signs in all figures. However, a skilled person will recognise that the figures each show corresponding features of the locknut.

In the various figures, a locknut 10 is shown which has a nut body 12 and a locking annular washer 22. The locknut 10 is made of steel, for example as a hexagonal nut; i.e. the nut body and annular washer are made of steel in the example. In the example shown, the nut body 12 has a concentric collar 14 on one end face and has a core hole 16, the diameter of which depends on the size of the nut and the internal diameter of the thread to be formed. In the figures, only the core hole 16 is shown, with an internal thread cut in it when the locknut is completed, also referred to hereinafter as the "nut thread". The inner edge or inner perimeter 18 of the collar 14 is offset outwardly relative to the core hole diameter of the locknut 10, to form a shoulder 20 between the core hole 16 and the collar 14 for receiving the locking washer 22.

The inner diameter $D_K$ of the collar is approximately 1.2 to 1.5 times the core hole diameter D, $D_K=1.2*D$ to $1.5*D$, for example approximately 1.3 times the core hole diameter D. The height of the collar 14 depends on the thickness of the locking annular washer 22 and may be, for example, approximately twice the thickness of the locking annular washer 22, wherein the thickness of the locking annular washer 22 may be approximately between a thread pitch and 1.5 times a thread pitch of the locknut 10. The height of the collar 14 is such that the locking annular washer 12 can be securely clamped when the collar is flanged, as described below. The collar 14 has a generally conical shape, with its thickness (measured in the radial direction) increasing from the face of the locknut in the axial direction. The thickness of the collar can be used to adjust its clamping and holding force after flanging, as explained below.

The locking annular washer 22, hereinafter also referred to as annular washer for short, is made of metal, preferably a resilient metal such as spring steel or spring band steel.

A series of projections 40 are formed on the shoulder 20, projecting in the axial direction, adjacent the inner wall 18 of the collar 14 and distributed around the perimeter of the shoulder. The following example relates to an embodiment in which the projections 40 are formed on the shoulder 20. In another embodiment, the projections or recesses may alternatively be formed on a side of the annular washer facing the shoulder 20 when the annular washer is inserted into the nut body to achieve the same or substantially the same effect as described with reference to FIGS. 5 to 9. In still other embodiments, recesses are formed in the shoulder similar to those shown with reference to the annular washer in FIGS. 16 and 17, the remaining material between the recesses having a similar function to the projections described above.

In the example shown in FIGS. 1 to 16, the projections 40 are in the form of an irregular tetrahedron, one face of each tetrahedron being adjacent the inner wall 18 of the collar and an adjacent face being adjacent the shoulder 20, and the two other sides of the tetrahedron enclosing a wedge shape. The face adjacent the shoulder 20 forms the base of the projection 40, and the apex line of the wedge-shaped projections 40 is inclined relative to the surface of the shoulder 20 so that the height of the projections 40 above the shoulder 20 decreases from the inner wall 18 of the collar 14 in the direction of the axis of the locking nut.

In the example, the projections 40 form a uniform row of teeth, the projections 40 being radially aligned and evenly distributed around the perimeter of the shoulder or annular washer. In various embodiments, at least 12, 16, 24 or at least 40 projections may be provided, depending on the size and application of the locknut. For example, a locknut of size M8 may have at least 16 projections, for example 20 projections, a locknut of size M12 may have at least 20 projections, for example, and a locknut of size M16 may have at least 40 projections, for example. The number of protrusions may depend on the perimeter of the core hole 16 or the inner wall 18 of the collar 14. The height of the protrusions 22, measured from the shoulder 20, may in one example be about one third of the height of the collar 14. The height of the projections 40 may also be dependent on the thickness of the securing annular washer 22 and may be, for example, 0.25 times the thickness of the washer to one washer thickness.

For example, in the example of an M12 size locknut, the internal diameter of the collar 14 may be approximately 12-15 mm. The height of the collar 14, measured from its line of contact with the shoulder 20, may be about 3.5 mm. If 24 protrusions are provided in this example, they have a centre-to-centre spacing of about 2 mm or 15°. The protrusions may have a maximum width of 2 mm at their base, at the widest point. The width of the projections at their base, at the widest point, may be, for example, about 1.8 mm, about 1.5 mm or about 1 mm. The height of the protrusions above the shoulder, at their highest point, may be, for example, about 0.5 mm to about 2 mm, for example, about 1 mm. The thickness of the annular washer 22 may be approximately in the range of 1.5 mm to 2.5 mm.

For example, in the example of an M20 size locknut, the inside diameter of the collar 14 may be approximately 20-25 mm. The height of the collar 14, measured from its line of contact with the shoulder 20, may be about 5 mm. If 32 protrusions are provided in this example, they have a centre-to-centre spacing of about 2 mm or 11.25°. The protrusions may have a maximum width of 2 mm at their base, at the widest point. The width of the projections at their base, at the widest point, may be, for example, about 1.8 mm, about 1.5 mm or about 1 mm. The height of the projections above the shoulder, at their highest point, may be, for example, approximately in the range of 0.5 mm to 3 mm, for example, approximately 0.6, 1.5 or 2.5 mm. The thickness of the annular washer 22 may be in the range of about 1.5 mm to 4 mm, and more particularly in the range of 2.5 mm to 3.75 mm.

The projections can be basically adjacent to each other at their base, at the widest point, or they can be arranged with a small distance of, for example, 0.5 mm to 2 mm, or in the case of very large locknuts, up to 5 mm or up to 1 cm.

While in the example shown the projections are wedge-shaped, with inclined apex line, the projections may also have other shapes, for example that of a convex curvature, in particular a circular or oval dome or a lying semi-circular cylinder, or other angular shapes, in particular a recumbent triangular cylinder, a gable roof, a non-inclined wedge or other tetrahedron or polyhedron. Variations of such shapes, for example with rounded or truncated corners, are also within the scope of the invention. With regard to the width, height and spacing of the projections, the above applies in principle.

Figure 7:
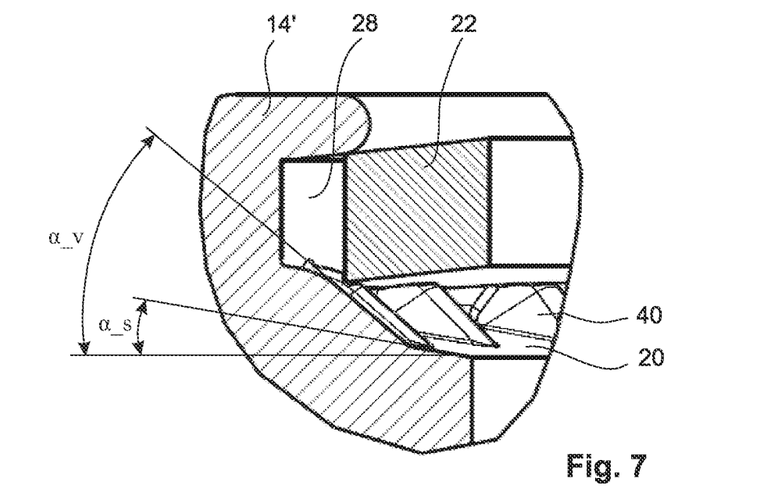
FIG. 7 an enlarged perspective view of section Y in FIG. 5.
Figure 8:
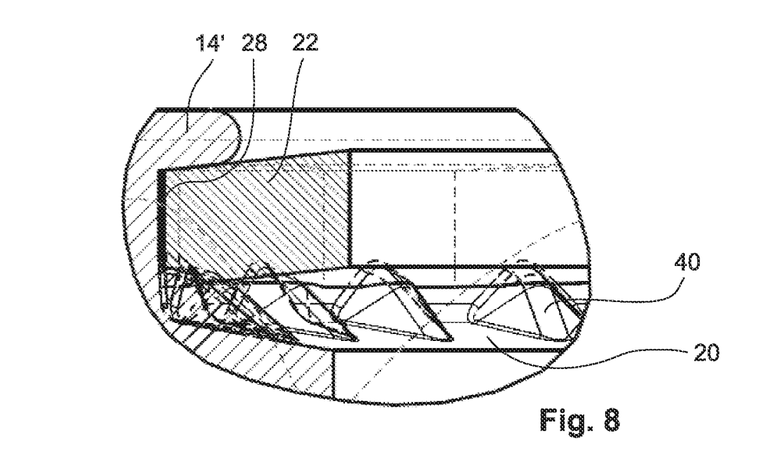
FIG. 8 an enlarged perspective view of the section X in FIG. 6.
Figure 9:
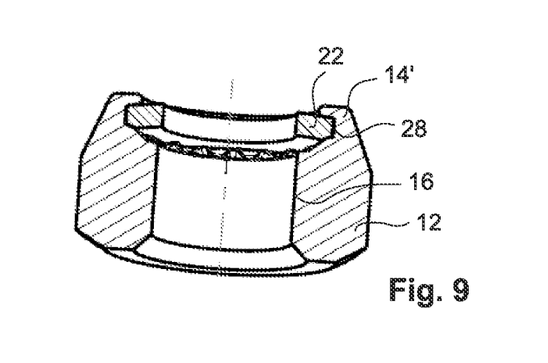
FIG. 9 a perspective longitudinal sectional view of the locknut of FIGS. 6 to 8.
Figure 10:
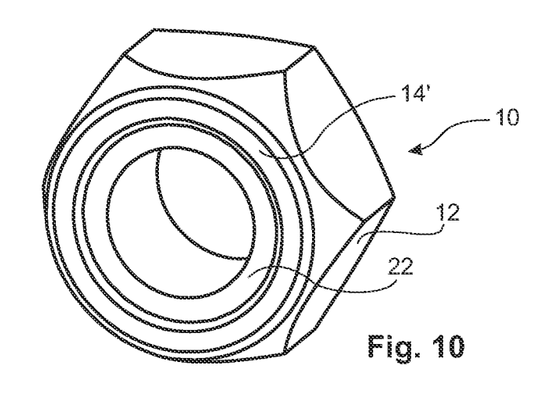
FIG. 10 a perspective view of a locknut from above, with the lock washer clamped in place according to the example.
Figure 11:
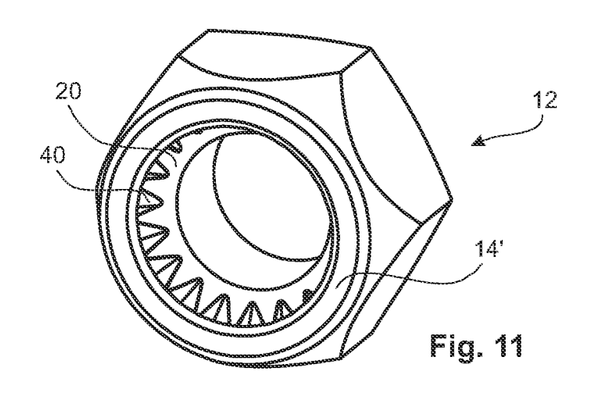
FIG. 11 a similar view to FIG. 10, with the locking annular washer hidden.

The shoulder 20 may be aligned relative to a radial plane of the locknut 1$o$ and thus form a right angle with the inner surface 18 of the collar 14, or it may be slightly inclined relative to the radial plane and slope away from the collar 14 in a radially inward direction. For example, the shoulder 20 may be inclined relative to the radial plane by an angle $\alpha\_s$ which may be, for example, up to 20°, for example about 10°. The apex line of the projections may have an angle of inclination $\alpha\_v$ relative to the same radial plane, for example in the order of 30° to 60°, for example at about 45°. These angles are shown in the illustration of FIG. 7, where the inclination of the shoulder and the inclination of the projections can best be seen.

Figure 12:
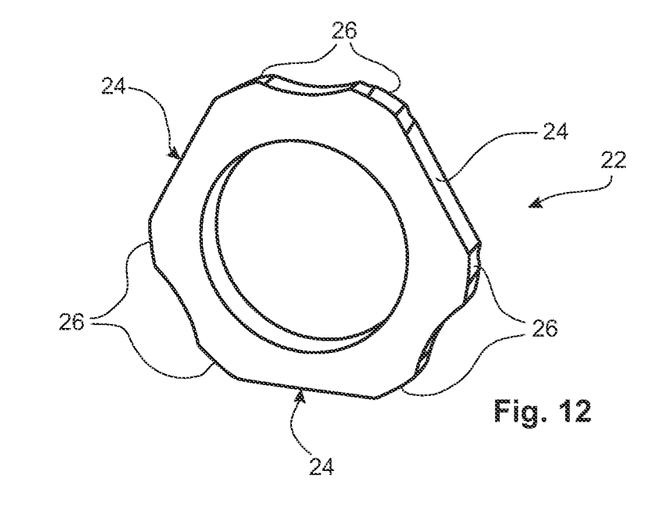
FIG. 12 a perspective view of a retaining annular washer according to an example.
Figure 13:
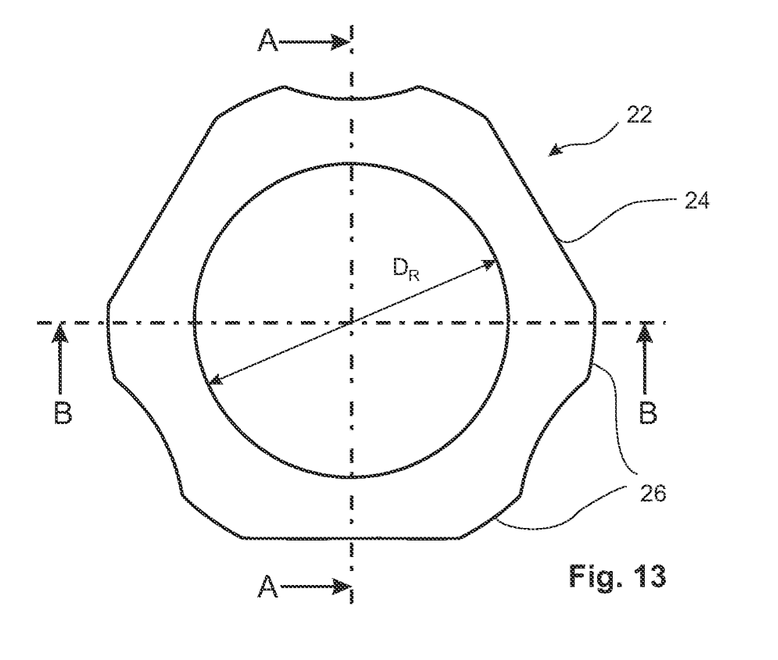
FIG. 13 a top view of the lock washer according to the example before it is inserted into the locknut.
Figure 14:
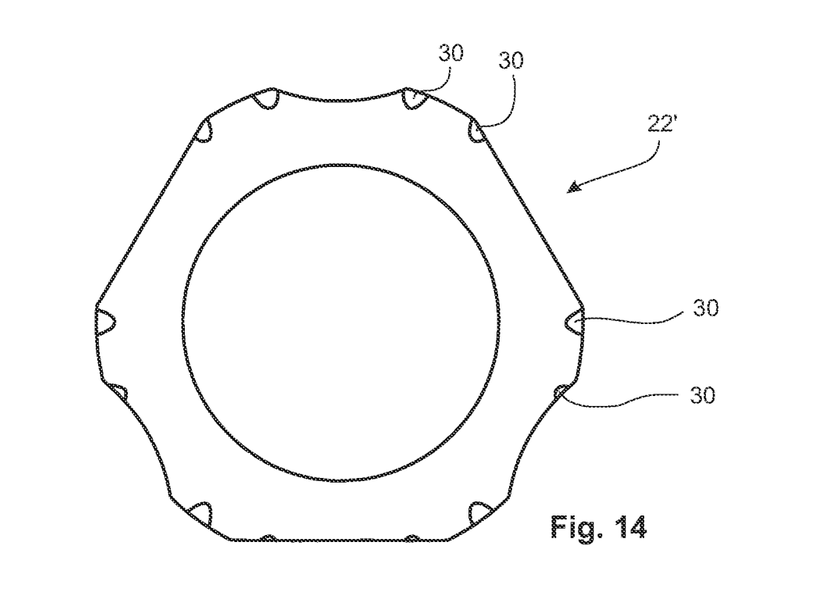
FIG. 14 a similar view to FIG. 13, with the retaining annular washer taken from a finished locking nut.

An example of the annular washer 22 is shown in FIGS. 12 to 14. It has a core hole diameter $D_R$ that is equal to or slightly smaller than the core hole diameter D of the nut body 12. In the example shown in FIGS. 12 to 14, the annular washer 22 has three cut-outs 24 where circular segments are missing from the outer perimeter of the annular washer 22. A pair of claws 26 is formed between each of the three cut-outs 24 on the perimeter of the annular washer 22. As explained below, the annular washer 22 is fixed in the nut body 12 in the area of each pair of claws 26, between the circular segment-shaped cut-outs 24, by flanging the collar 14.

The annular washer 22 may have a uniform thickness, or the thickness of the annular washer 22 may be greater at its inner diameter than at its outer diameter. By varying the thickness of the locking annular washer 22 across its diameter, the elasticity of the annular washer and thus the retention force of the locking nut can be adjusted. For example, the thickness of the annular washer 22 at its outer diameter may be equal to or less than the height of a thread pitch of the nut thread, e.g. it may be in the range of half a thread pitch to one thread pitch. For example, the thickness at the outer diameter may be approximately three quarters of a thread pitch. The thickness of the annular washer 22 at its inner diameter may be greater than or equal to one thread pitch and less than or equal to 2.5 thread pitches. For example, the thickness at the inner diameter is between one and two thread pitches, such as approximately 1.5 thread pitches. In practice, if the thickness of the annular washer at its inner diameter is more than two thread pitches, an excessive braking torque of the locknut occurs when screwing in a bolt in most applications, whereby the braking torque and the holding force also depend on the overall dimensions of the locknut and the nut thread as well as on the size of the axial offset of the thread of the annular washer 22 relative to the nut thread.

When the locknut is manufactured, the annular washer 22 is first placed on the shoulder 20 delimited by the collar 14. In this pre-assembled state, the annular washer 22 may have a convex curvature in the direction of the front side of the locknut, as can be seen particularly well in FIGS. 5 and 6.

Figure 1:
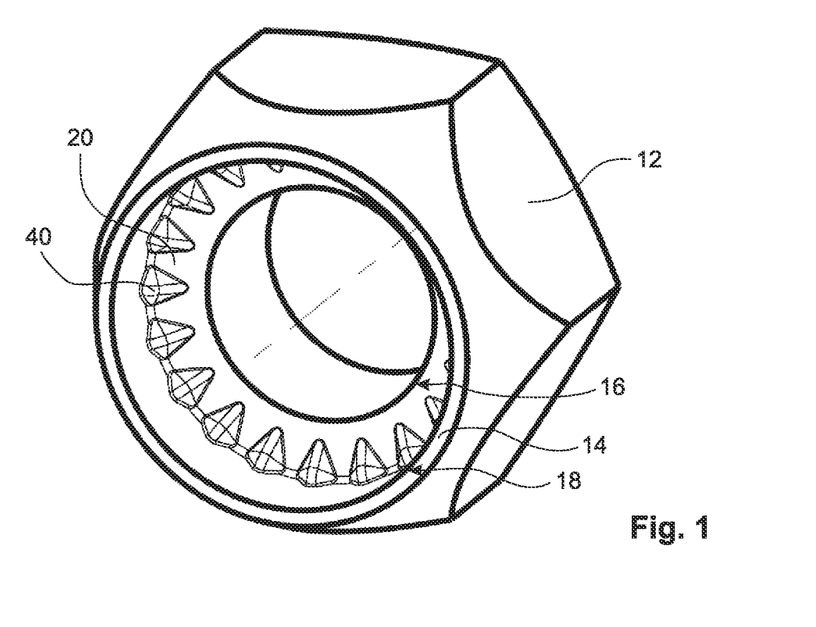
FIG. 1 a perspective view of a nut body of the locknut from above, before insertion of the lock washer, according to an example.
Figure 2:
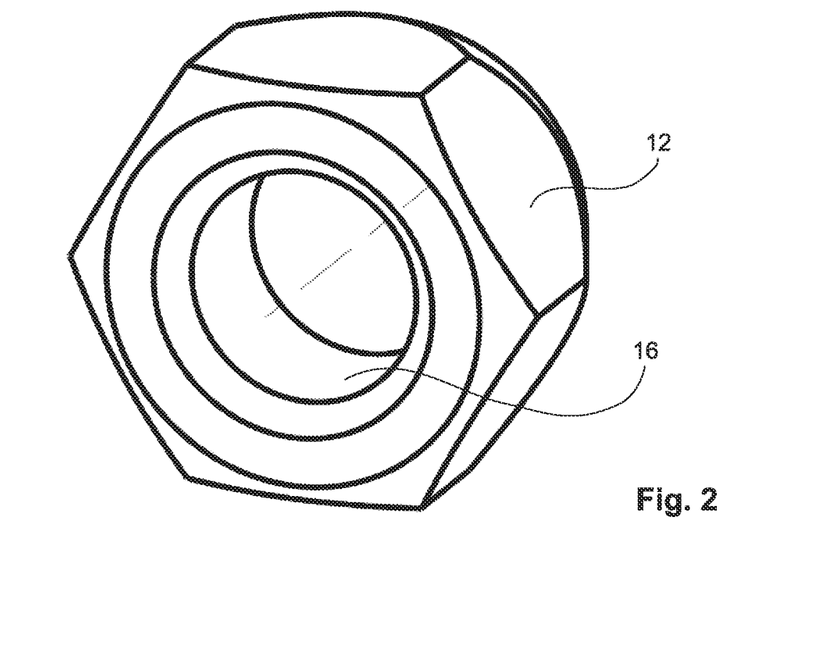
FIG. 2 a perspective view of a nut body of the locknut from below, according to the example.
Figure 3:
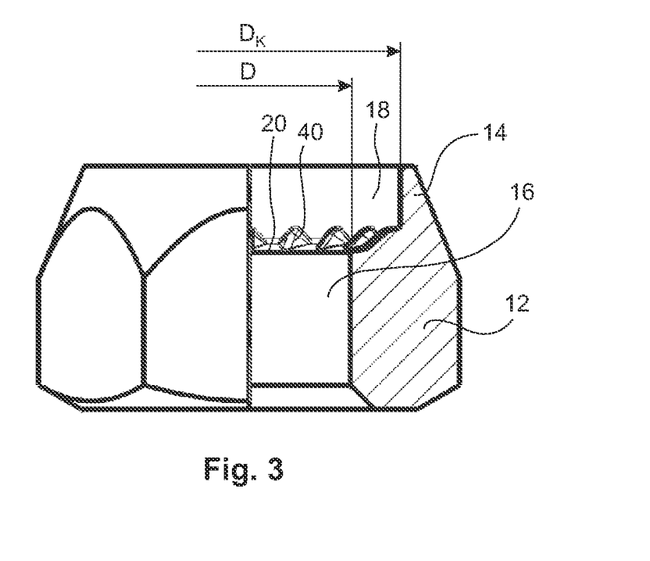
FIG. 3 a vertical sectional view of the nut body of FIG. 1.
Figure 4:
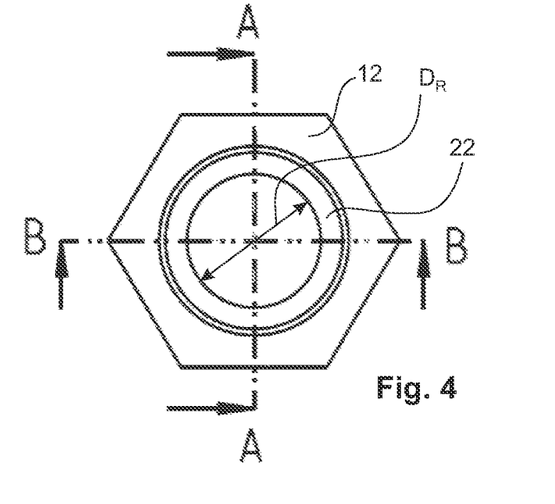
FIG. 4 a top view of the locknut to explain sectional planes of FIGS. 5 and 6.
Figure 5:
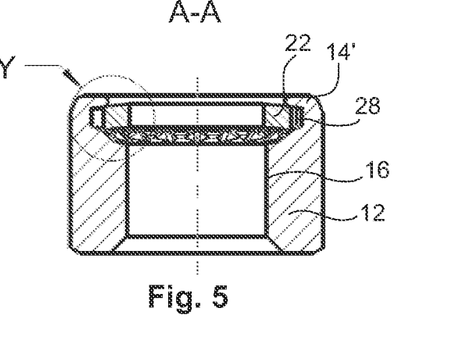
FIG. 5 a vertical section through a locknut with nut body and fixed lock washer along section line A-A in FIGS. 4 and 13, according to the example.
Figure 6:
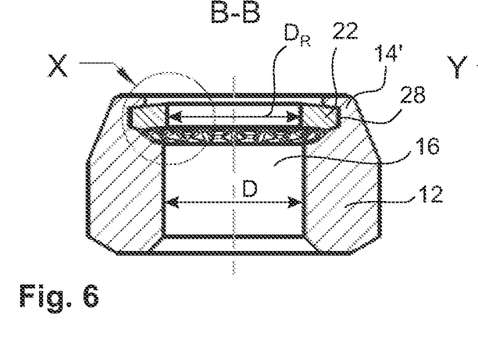
FIG. 6 a vertical section through a locknut with nut body and fixed lock washer along section line B-B in FIGS. 4 and 13, according to the example.

Subsequently, as shown in FIGS. 5 to 9, the collar 14 is deformed and drawn in at its upper end by means of a pressure punch or the like by flanging, so that an annular groove 28 is formed in which the annular washer 22 is held axially immovably. The flanged collar is marked 14'. To flange the collar 14, a first pressing force is applied which is sufficient to deform the collar and, during the deformation, to press the annular washer 22 onto the projections 40 in such a way that they penetrate a small distance into the material of the annular washer 22. For example, the pressing force can be adjusted so that the projections 40 penetrate up to one third of their height into the material of the annular washer 22. In this way, the annular washer 22 is not only fixed in the axial direction within the annular groove 28, but is also secured against rotating. This condition is illustrated in FIGS. 5 to 9, with FIGS. 5 and 7 showing sectional views whose sectional planes A-A and B-B are illustrated relative to the orientation of the securing annular washer 22 in FIGS. 4 and 13. The sectional plane A-A of FIG. 5 intersects one of the cut-outs 24 and an opposing space between a pair of claws 26, such that the annular washer 22 does not abut the inner wall 18 of the collar 14 at these locations. The cutting plane B-B intersects two opposing claws 26 so that the annular washer 22 is adjacent to the inner wall 18 of the collar 14 at these locations.

After securing the annular washer 22 in the annular groove 28, a cutting tool is used to cut an internal thread simultaneously in the nut body 12 and in the annular washer 22 so that the nut body 12 and the annular washer 22 have identical and continuous threads (not shown in the figures). Since the projections 40 are partially pressed into the material of the annular washer 22, the annular washer 22 is secured against rotation while forming the thread. The claws 26 can provide additional anti-rotation protection.

A second pressing force is then applied to the flanged collar 14' by means of the same or another pressure die, whereby the annular washer 22 is slightly displaced axially in the direction of the nut thread, so that the nut thread and the internal thread of the annular washer 22 are axially offset with respect to each other. The axial offset of the annular washer 22 may be approximately 5-30% preferably 10-20% of a thread pitch, so that the offset of the two threads from each other is between a quarter and half of a thread pitch. The second pressing force may be approximately equal to the first pressing force and is adjusted to achieve a desired offset of the threads of the nut body 12 and the annular washer 22. This desired offset may be adjusted depending on, for example, a desired retaining torque of the locknut. Since the locking annular washer does not rest flat on the shoulder 20, but on the projections 40, the axial offset of the locking annular washer 22 can be adjusted evenly and precisely. In the process, the projections 40 can be deformed and/or penetrate further into the material of the annular washer 22.

FIGS. 13 and 14 show an example of a retaining annular washer 22' before and after completion of the locking nut, with recesses 30 formed by the penetration of the projections 40 illustrated in FIG. 14. The recesses 30 are located in the area of the locking annular washer 22' that is cramped between the projections 40 and the flanged collar 14'.

Figure 15:
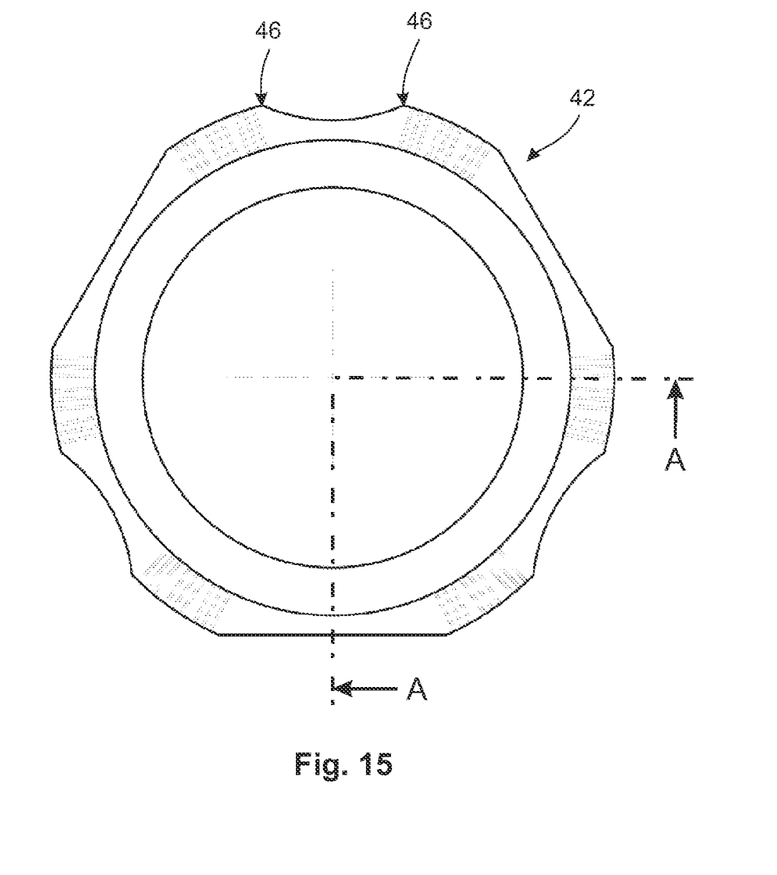
FIG. 15 a top view of the retaining annular washer according to another example.
Figure 16:
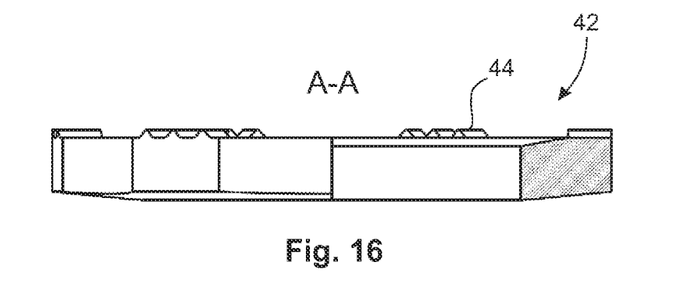
FIG. 16 a sectional view through the securing annular washer of FIG. 15 along line A-A.

FIGS. 15 and 16 show another example of an annular washer 42 with projections 44 formed on its surface. The geometry of the annular washer 42 can be basically the same or similar as described with reference to FIGS. 12 to 14, except for the formation of the projections 44. Reference is made to the above description of FIGS. 12 to 14.

In the example of FIGS. 15 and 16, there are six groups of three projections 44 each on the claws 46 distributed around the perimeter of the annular washer 42. This is only an example, and different numbers of projections may be provided and may also be arranged, grouped or evenly distributed and also shaped differently than shown in FIGS. 15 and 16. In the example of FIGS. 15 and 16, the projections 44 may be similar in shape to the projections 40 on the shoulder 20 of the locknut. This applies in particular with regard to the shape, dimensions and relative arrangement of the projections 44. Reference is made to the above description.

The annular washer 42 of FIGS. 15 and 16 can be paired with a locknut that does not need to have protrusions or recesses formed on its shoulder, which can therefore have a smooth surface. The finished locknut may be manufactured in principle as explained with reference to FIGS. 5 to 9, although in the example of FIGS. 15 and 16 the projections 44 on the annular washer 42 rather than projections on the shoulder are deformed. Reference is made to the above description of FIGS. 5 to 9.

Figure 17:
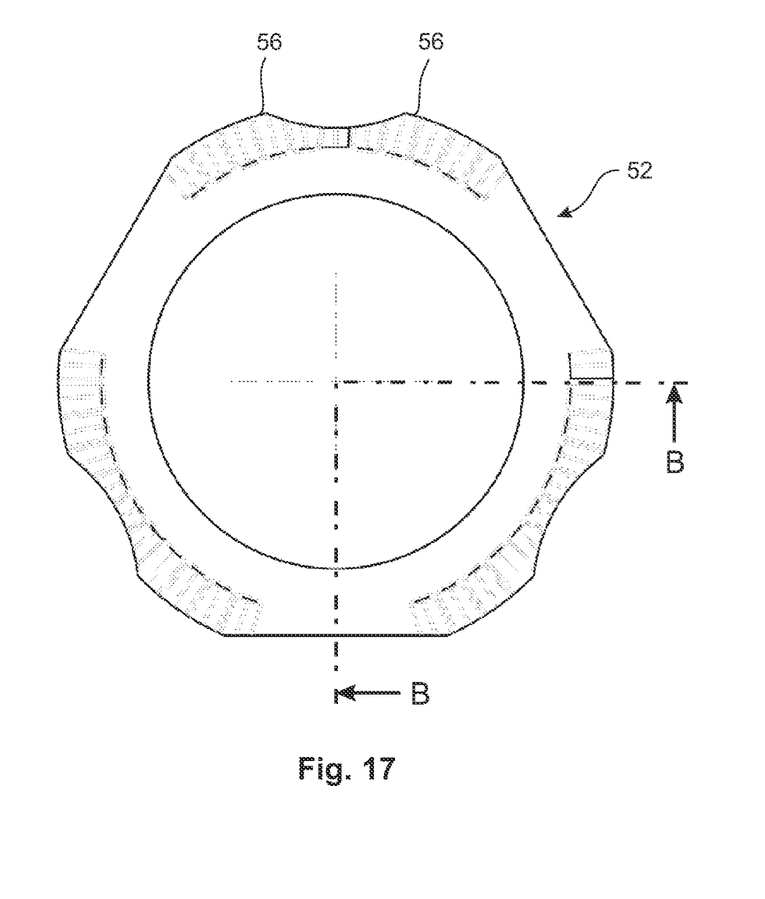
FIG. 17 a top view of the retaining annular washer according to another example.
Figure 18:
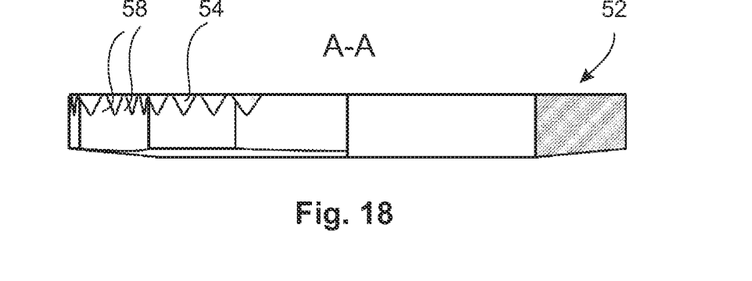
FIG. 18 a sectional view through the securing annular washer of FIG. 17 along line B-B.
Figure 19:
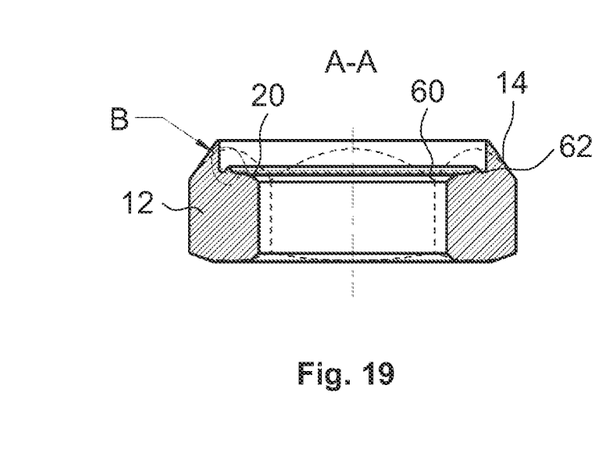
FIG. 19 a vertical section through a nut body of a locknut along section line A-A in FIG. 21, according to another example.
Figure 20:
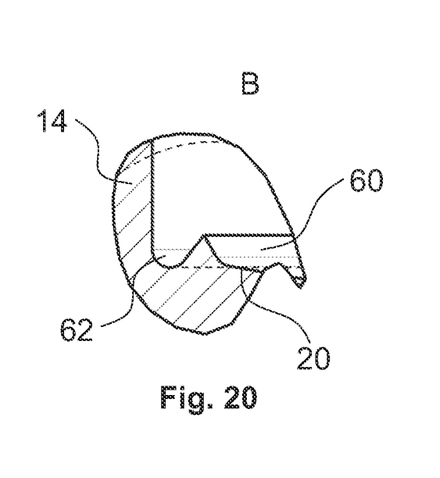
FIG. 20 an enlarged perspective view of section B in FIG. 19.
Figure 21:
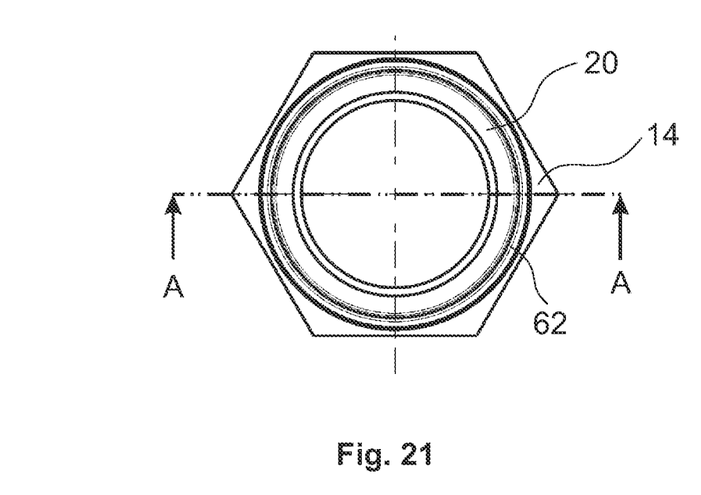
FIG. 21 a top view of the nut body according to the example in FIG. 19.

FIGS. 17 and 18 show yet another example of an annular washer 52 with recesses 54 formed on its surface. The geometry of the annular washer 52 can be basically the same or similar as described with reference to FIGS. 12 to 14, except for the formation of the recesses 54. Reference is made to the above description of FIGS. 12 to 14.

In the example shown in FIGS. 17 and 18, three groups of eleven recesses 54 are formed around the perimeter of the annular washer 52, each on and between the claws 56. This is of course only an example, and different numbers of recesses may be provided and may also be arranged, grouped and shaped differently from those shown in FIGS.

17 and 18. In the example shown in FIGS. 17 and 18, the material remaining between the recesses 54 results in tooth-like or rib-like structures 58 which may be similar in design to the projections 40 on the shoulder 20 of the locknut 10, particularly with regard to the shape, dimensions and relative arrangement of the tooth-like or rib-like structures 58. Reference is made to the above description of the projections.

The annular washer 52 of FIGS. 17 and 18 may be paired with a locknut 10, the shoulder of which needs not have protrusions or recesses formed thereon, and which may therefore have a smooth surface. The locking nut may be manufactured in principle as explained with reference to FIGS. 5 to 9, although in the example of FIGS. 17 and 18 the tooth or rib-like structures 58 on the annular washer 52 are deformed rather than projections on the shoulder. Reference is made to the above description of FIGS. 5 to 9.

In a further embodiment, which is not shown in the figures, recesses may also be formed on the shoulder 20 of the locking nut 10 instead of the projections 40, between which tooth-like or rib-like structures are formed from the material remaining between the recesses, which may be similar to those shown in FIGS. 17 and 18. In this case, too, the manufacture of the locknut is basically as explained with reference to FIGS. 5 to 9, although in this case, too, it is not the projections but the tooth- or rib-like structures 58 that are deformed on the shoulder.

A further embodiment of the locknut is shown in FIGS. 19 to 25. The locknut is constructed with a nut body 12 and a locking annular washer 22 basically as described above with reference to FIGS. 1 to 18, to which reference is made. In particular, the annular washer 22 may be as described with reference to FIGS. 12 and 13. In the following, only the differences will be discussed. The same reference signs are used as in the preceding figures to denote identical or corresponding features. Unless otherwise described, the above remarks on the locknut apply mutatis mutandis.

In the example of FIGS. 19 to 25, a perimetral rib 60 is first formed on the shoulder 14. This can be produced, for example, by turning the nut body 12 by making a perimetral puncture 62 adjacent to the collar 14. Optionally, additional material may be removed from the surface of the shoulder 20 on the side of the rib 60 facing away from the puncture 62, i.e. in a radially inward direction, to define the rib 60 of desired width and height. The width and height of the rib 60 may be fundamentally similar to the width and height of the protrusions 40 described in the previous embodiments.

For example, the rib 60 may have a maximum width of 3 mm preferably 1-2 mm at its base, at its widest point. The height of the rib above the shoulder, at its highest point, can for example be approximately in the range of 0.5 mm to 2 mm, for example approximately 1 mm. These values are of course only examples and may vary depending on the size of the locknut, the thread, the material used, the holding force to be set and other factors. The rib can, for example, have a basically approximately triangular or trapezoidal cross-section, or a cross-section in the form of a semicircle, semi-oval or parabola.

Figure 22:
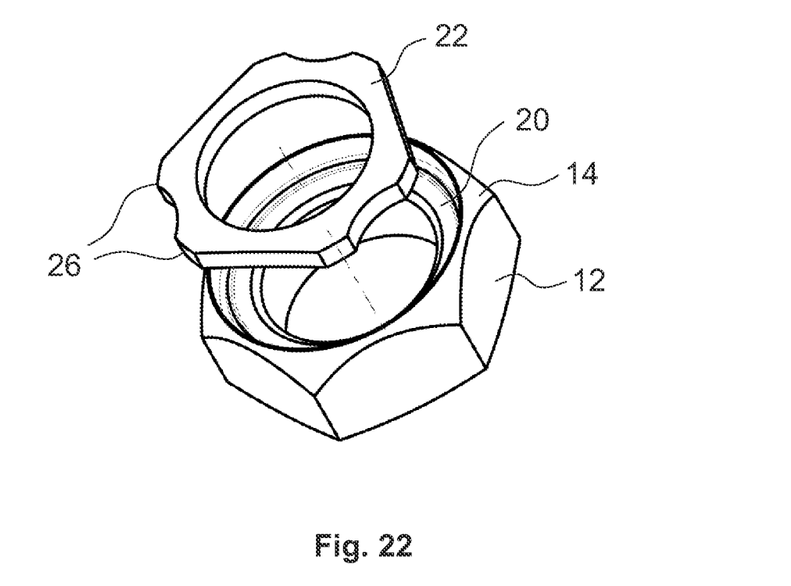
FIG. 22 a perspective view of the nut body according to the example of FIG. 19, before inserting the annular washer.

FIG. 22 shows how the annular washer 22 is placed on the nut body 12. After inserting the annular washer 22, the collar 14 is also flanged in this embodiment in order to secure the annular washer 22 in the ring groove 28 against rotation, as described above with reference to FIGS. 6 to 9. In the example of FIGS. 19 to 25, an annular washer 22 is used which has prolongations projecting outwards in the radial direction, for example claws 26, as explained with reference to FIGS. 12 and 13. The connection between the annular washer and the nut body, the formation of the thread and the deformation of the annular washer can basically be carried out as described above with reference to FIGS. 1 to 18.

Figure 23:
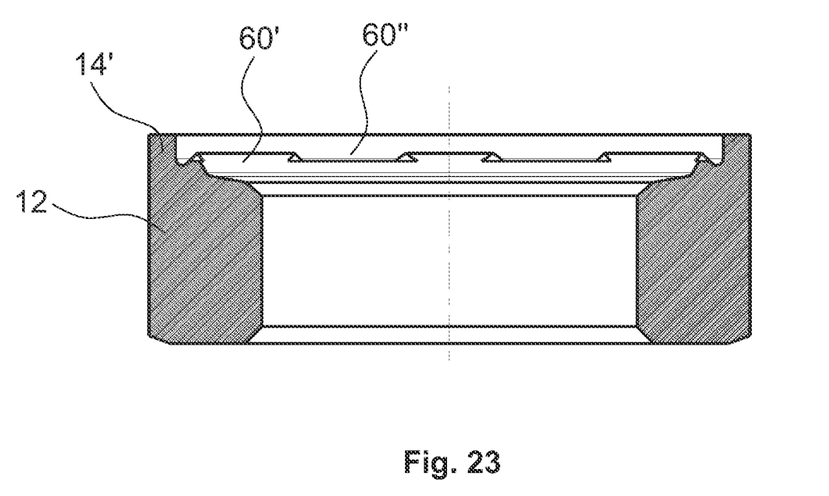
FIG. 23 a similar sectional view through the nut body as in FIG. 19, after a annular washer has been inserted and removed again, to explain the example.
Figure 24:
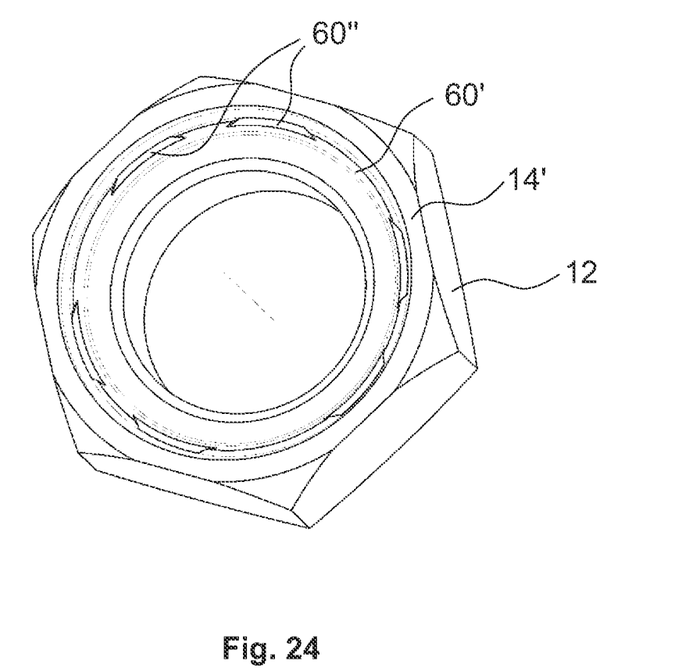
FIG. 24 a perspective view of the mother body of FIG. 23.
Figure 25:
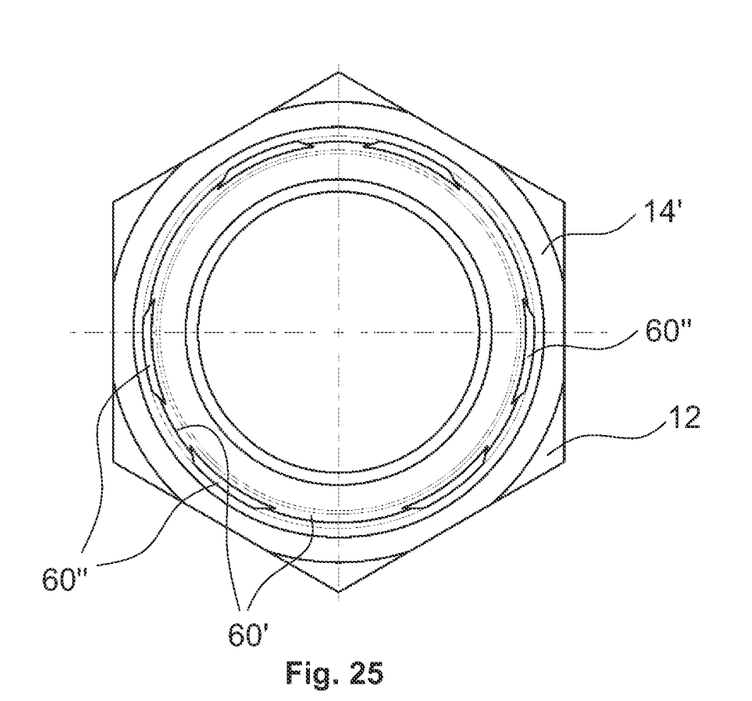
FIG. 25 a top view of the nut body of FIG. 23.

FIGS. 23 to 25 show different views of the nut body after an annular washer, such as the one shown in FIG. 22, has been inserted and removed again. Removal of the annular washer is not intended when the locknut is used as intended. However, in order to verify the deformation of the rib 60, the flanged part of the collar 14 can be milled off, for example, so that the collar stub 14' shown in FIG. 23 remains.

As shown in FIGS. 23 to 25, the claws 26 are forced into the rib 60 and deform the rib 60 to define perimetrally aligned projections 60' separated by recesses 60" in the rib 60 corresponding to the claws. The recesses 60" may fully or partially displace the material of the rib 60 in the radial direction, forming separate protrusions 60' or perimetrally continuous protrusions formed by residual material of the rib 60. In both cases, the annular washer 22 rests with its claws 26 in the recesses 60" and is secured against rotation therein.

In an alternative embodiment, a perimetral rib may also be formed on a surface of the annular washer, and corresponding projections or claws may be arranged on the shoulder of the nut body in the perimetral direction so that the projections or claws penetrate into the rib on the annular washer when the collar is flanged. The effect achieved is the same as described above in relation to FIGS. 19 to 25.

In the described embodiment, the locking annular washer 22 in the pre-assembled state has a convex curvature in the direction of the front side of the nut body 12, i.e. a curvature facing away from the nut thread. When forming the axial offset of the threads, this convex curvature can be reduced somewhat, but it is not compensated or even reversed. This pre-curvature of the locking annular washer 22 in the prefabricated state can ensure a more defined deformation behaviour when forming the axial offset and thus a more precise setting of the axial offset and the resulting retaining force of the locking nut can be achieved.

A threaded bolt, not shown, screwed into the nut is clamped on all sides by the annular washer 22, whereby the spring force of the annular washer in the axial direction and the axial offset of the threads are decisive for the clamping force. The spring force of the annular washer 22 is largely determined by its elasticity. In addition, the clamping force of the locknut can be adjusted by the thickness of the collar 14. A thinner collar, in particular a thinner front edge of the collar, can give the collar a certain elasticity so that it can yield somewhat when the bolt is screwed in.

The features disclosed in the foregoing description, the figures and the claims may be significant both individually and in any combination for the realisation of the invention in its various embodiments.

What is claimed is:

1. A locknut with a nut body having a threaded portion with an internal thread, a perimetral shoulder adjacent thereto and a collar surrounding the shoulder, and with an annular washer made of metal, wherein the collar is bent inwards and an annular groove is formed between the bent collar and the shoulder, wherein the annular washer is received in the annular groove, an internal thread corresponding to the internal thread of the threaded portion is formed at the inner perimeter of the annular washer, the internal thread of the annular washer is being axially offset by a distance relative to the internal thread of the nut body, and a series of projections or recesses is formed on the shoulder or on the annular washer where the annular washer and the shoulder mutually overlap, the projections or recesses projecting or recessing in the axial direction and being arranged distributed around the perimeter of the annular washer or of the shoulder.

2. The locknut of claim 1, wherein the shoulder comprises a shoulder surface inclined relative to a radial plane of the locknut toward the thread axis by an angle $\alpha\_s$, wherein $\alpha\_s$ is in the range 0° to 15°.

3. The locknut of claim 1, wherein the projections or recesses are adjacent to the collar.

4. The locknut according to claim 1, wherein the projections or recesses extend in radial direction from the collar up to a part of the shoulder, in particular up to ½ to ⅘ of the radial extension of the shoulder.

5. The locknut according to claim 1, wherein the width, B, of the projections or recesses relative to the centre-to-centre distance, A, of the projections or recesses where they face the collar is equal to or approximately equal to B=b*A, where b ranges from 0.2 to 1.

6. The locknut according to claim 1, wherein the projections or recesses are radially aligned or arranged uniformly distributed around the perimeter of the shoulder or annular washer.

7. The locknut according to claim 1, wherein the projections or recesses are formed or moulded onto a surface of the annular washer facing the nut body.

8. The locknut according to claim 1, wherein the width of the projections or the recesses or the height of the projections or the depth of the recesses decrease inwardly in the radial direction.

9. The locknut according to claim 1, wherein perimetrally aligned projections are formed on the shoulder of the nut body, wherein a perimetrally extending single- or multi-part rib is formed on the shoulder of the nut body, wherein recesses are formed in the rib by receiving the annular washer in the annular groove, the recesses reshaping the rib into the plurality of perimetrally arranged projections.

10. The locknut of claim 9, wherein the perimetral rib is one-piece before the annular washer is received in the annular groove and is formed by a frontal puncture in the shoulder adjacent the collar.

11. The locknut according to claim 1, wherein perimetrally aligned projections are formed on the surface of the annular washer facing the shoulder of the nut body, wherein a perimetrally extending single- or multi-part rib is formed on the surface of the annular washer, and recesses are formed in the annular groove by receiving the annular washer, which recesses reshape the rib into the plurality of perimetrally arranged projections.

12. The locknut of claim 11, wherein the perimetral rib is one-piece before the annular washer is received in the annular groove and is formed by a frontal puncture in the surface of the annular washer.

13. The locknut according to claim 1, wherein the internal thread of the annular washer is axially offset with respect to the internal thread of the nut body by a distance which is 3-30% of the thread pitch.

14. The locknut according to claim 1, wherein the thickness of the annular washer at its inner diameter is equal a thread pitch of the internal thread.

15. The locknut according to claim 1, wherein the annular washer is convexly curved in the direction of the front side of the locknut.

16. The locknut according to claim 1, wherein one or more cut-outs distributed over the perimeter of the annular washer are formed in the outer perimeter of the annular washer, wherein the cut-outs define one or more prolongations on the perimeter of the annular washer.

17. A method of manufacturing a locknut with a nut body having a threaded portion with an internal thread, a perimetral shoulder adjacent thereto, and a collar surrounding the shoulder, and with an annular washer made of metal, wherein the collar is bent inwards and an annular groove is formed between the bent collar and the shoulder, wherein the annular washer is received in the annular groove, an internal thread corresponding to the internal thread of the threaded portion is formed at the inner perimeter of the annular washer the internal thread of the annular washer is being axially offset by a distance relative to the internal thread of the nut body and a series of projections or recesses is formed on the shoulder or on the annular washer where the annular washer and the shoulder mutually overlap, the projections or recesses projecting or recessing in the axial direction and being arranged distributed around the perimeter of the annular washer or of the shoulder, the method comprising;
  placing the annular washer inside the collar on the shoulder of the still unthreaded nut body,
  applying a first force is applied axially to the collar to flange the collar inwardly and form an annular groove between the flanged collar and the shoulder in which the annular washer is axially clamped, wherein by applying the first force the projections or recesses are deformed by a first distance,
  then forming in a single operation an internal thread is formed in the nut body and the annular washer, and subsequently applying a second force in the axial direction to the collar and the annular groove in which the annular washer is clamped to displace the annular washer in the axial direction, wherein by applying the second force the projections or recesses are deformed by a second distance.

18. The method of claim 17, wherein the locknut comprises perimetrally aligned projections formed on the shoulder of the nut body, wherein a perimetrally extending single- or multi-part rib is formed on the shoulder of the nut body, wherein recesses are formed in the perimetrally extending single- or multi-part rib by receiving the annular washer in the annular groove, the recesses reshaping the perimetrally extending single- or multi-part rib into the plurality of perimetrally arranged projections, wherein the method comprises forming the perimetrally extending single-or multi-part rib on the shoulder of the nut body by a frontal puncture into the shoulder adjacent to the collar;
  placing the annular washer within the collar on the shoulder of the still unthreaded nut body; and
  applying a first force axially to the collar to flange the collar inwardly and form an annular groove between the flanged collar and the shoulder in which the annular washer is axially clamped, wherein by applying the first force the claws penetrate the perimetral rib and come to rest in recesses formed thereby in the rib.

19. The method of claim 18, characterized in that an internal thread is formed in the nut body and in the annular washer in a single operation, and
  then a second force is applied in the axial direction to the collar and the annular groove in which the annular washer is clamped to displace the annular washer in the axial direction, wherein by applying the second force the claws penetrate the rib by a further distance.

20. The method of claim 17, characterised in that the annular washer is produced with convex curvature in a pre-processing step and is placed on the shoulder of the nut body such that the annular washer is convexly curved in the direction of front side of the locknut, wherein the convex curvature of the annular washer is substantially maintained upon deformation.

\* \* \* \* \*